United States Patent [19]
Kauffman et al.

[11] Patent Number: 4,956,207
[45] Date of Patent: Sep. 11, 1990

[54] BONDING METHOD EMPLOYING SPRAYABLE HOT MELT ADHESIVES FOR CASE AND CARTON SEALING

[75] Inventors: Thomas F. Kauffman, Easton, Pa.; Paul P. Puletti, Glen Gardner, N.J.

[73] Assignee: National Starch and Chemical Investment Holding Corporation, Wilmington, Del.

[21] Appl. No.: 270,151

[22] Filed: Nov. 14, 1988

[51] Int. Cl.$^5$ .............................................. B29D 22/00
[52] U.S. Cl. .................................. 428/34.2; 156/334; 428/35.7; 525/240; 526/348.6
[58] Field of Search ............. 156/334; 428/34.2, 35.7; 525/240; 526/348.6; 229/48 T

[56] References Cited

U.S. PATENT DOCUMENTS

| | | | |
|---|---|---|---|
| 3,573,240 | 3/1971 | Flanagan | 260/23 |
| 4,568,713 | 2/1986 | Hansen et al. | 526/348.6 |
| 4,761,450 | 8/1988 | Lakshmanan et al. | 525/240 |
| 4,816,306 | 3/1989 | Brasy et al. | 229/48 T |
| 4,824,889 | 4/1989 | Mostert | 525/240 |
| 4,826,909 | 5/1989 | Lakshmanan et al. | 525/240 |

OTHER PUBLICATIONS

"Improve the Performance of Your Hot Melt Adhesives and Sealants with Shell Duraflex ® Polybutylene Polymers", Shell Chemical Company.
"Polybutylene–A New Polymer for Hot Melt Adhesives", Shell Chemical Company.

Primary Examiner—John J. Gallagher
Attorney, Agent, or Firm—Edwin M. Szala; Ellen T. Dec

[57] ABSTRACT

Rigid substrates for case and carton sealing and tray-making applications are bonded by spray application of a hot melt adhesive composition comprising 25 to 50 percent of an isotactic thermoplastic polybutene-1/ethylene copolymer containing from about 5.5 to about 10% by weight ethylene; 20 to 60 percent of a tackifier; 15 to 30 percent of an amorphous diluent having a softening point greater than 90° C.; 0 to 2 percent antioxidant; and 0 to 10 percent wax or oil.

14 Claims, No Drawings

BONDING METHOD EMPLOYING SPRAYABLE HOT MELT ADHESIVES FOR CASE AND CARTON SEALING

This invention is directed to the use of selected sprayable hot melt adhesive formulations for various case and carton sealing, and traymaking applications.

Case sealing, carton sealing, and traymaking require hot melt adhesives with the following properties: high heat resistance, low viscosity (under 10,000 cps), excellent adhesion to paper stocks, good heat stability, and fast set speed. Additionally, spray application of hot melts requires that the hot melt used possess long open time to compensate for the micronization or partitioning of the molten adhesive stream. This micronization or partitioning causes the adhesive to set-up much faster than if a continuous bead were applied.

Spray application of hot melt adhesives for use in case and carton sealing and traymaking is advantageous because it allows for greater cross-sectional coverage of the substrate without increasing the amount of adhesive used. The spray pattern can be likened to a web whereas conventional patterns applied by extrusion utilize beads or dots. The latter patterns do not offer efficient cross-sectional coverage.

The combination of long open time with the aforementioned properties necessary for traymaking and case and carton sealing is not attainable with known ethylene vinyl acetate (EVA), polyethylene, ethylene-n-butylacrylate (ENB), styrene-butadiene-styrene (SBS), styrene-isoprene-styrene (SIS), or styrene-ethylene-butylene-styrene (SEBS) based hot melt adhesives.

This invention consists of the use of a new copolymer of isotactic polybutylene (tradename Duraflex$^R$ from Shell) to accomplish what has not been possible up until now; i.e., offer high heat resistance, low viscosity, excellent adhesion, good heat stability, fast set, and long open time needed for spraying the adhesive. Although polybutylene has been proposed as a long open time copolymer for hot melt adhesives our work has shown that a set of specific diluents and tackifying resins are needed to give the desired combination of long open time and high heat resistance, low viscosity, excellent adhesion, good heat stability, and fast set.

Polybutylene resin by itself does not give the desired properties. Our work has confirmed that polybutylene must be used in conjunction with a high softening point, amorphous diluent and a tackifying resin selected from a defined group of tackifying resins, or mixtures thereof. Small amounts of co-diluents may be used.

SUMMARY OF THE INVENTION

Thus, we have now found that superior hot melt adhesive compositions which are sprayable and adapted for bonding rigid substrates in various construction applications can be prepared from 25 to 50 weight percent of an isotactic thermoplastic polybutene-1/ethylene copolymer containing from about 5.5 to about 10% by weight ethylene; 20 to 60 percent of a tackifier; 15 to 30 percent of an amorphous diluent having a softening point greater than 90° C.; 0 to 2 percent of a stabilizer; and 0 to 10 percent wax or oil.

The adhesive is formulated so as to have a viscosity of less than 10,000 cps, preferably less than 6,000 cps at 175° C., a heat stress value of 115° F. or greater; a peel value of 130° F. or greater; a shear value of 160° F. or greater, an open time sufficient to allow for spraying at commercially utilized adhesive deposition levels and good adhesion to paper stocks.

The polybutylene copolymers employed herein are copolymers of polybutene-1 and ethylene wherein the ethylene content varies from about 5.5 to about 10% by weight of the copolymer. The applicable isotactic polybutylenes are relatively rigid while in their plastic form but flow readily upon being heated. Expressing molecular weight in terms of "melt index", the applicable isotactic polybutylenes to be used in the present adhesive should exhibit a melt index in the range of from about 5 to 2000 dg/min and preferably from 400 to 700 dg/min. The latter melt flow values are determined by the method described in ASTM D 1238 and are inversely related to molecular weight, i.e., the lower the melt index, the higher the molecular weight. These copolymers are available from Shell Chemical Company under the Duraflex trademark as Duraflex 8310, 8410, 8510 and 8910, with the 8910 having a melt index of about 700, a grade preferred for use herein. Mixtures of these copolymers may also be used.

The tackifying resins which may be used to extend the adhesive properties of the isotactic polybutylene include: (1) hydrogenated wood rosin or rosin ester; (2) polyterpene resins having a softening point, as determined by an ASTM method E28-58 T, of from about 80° C.-150° C., the latter polyterpene resins generally resulting from the polymerization of terpene hydrocarbons in the presence of Friedel-Crafts catalysts at moderately low temperatures and including the latter resins which are aromatically modified; examples of commercially available resins of this type being the Nirez resins sold by Reichhold Chemical, the Zonatac resins sold by Arizona, and the Piccolyte S-10, S-25, S-40, S-85, S-100, S115, S-125 and S-135 resins as sold by Hercules Chemical; (3) aliphatic petroleum hydrocarbon resins having a Ball and Ring softening point of from about 80°-160° C., resulting from polymerization of monomers consisting primarily of 5 carbon atom olefins and diolefins, and including the latter resins which are aromatically modified, examples of commercially available resins of this type being Wingtack 95 and Wingtack Extra as sold by the Goodyear Tire and Rubber Company and the Escorez 1000 series of resins sold by the Exxon Chemical Corporation; and (4) hydrogenated hydrocarbon resins such as Resin H-130 from Eastman, Escorez 5000 series from Exxon, and Regalrez from Hercules.

The amorphous diluents which are needed and present in the adhesive composition include (atactic) amorphous polypropylene or other similar high softening point (i.e. greater than 90° C.), low crystalline diluent, (e.g. amorphous polyalphaolefins). These diluents, are used at levels of 15 to 30% by weight, preferably about 20 to 25% by weight.

Among the applicable stabilizers or antioxidants utilized herein are included high molecular weight hindered phenols and multifunctional phenols such as sulfur and phosphorous-containing phenols. Representative hindered phenols include: 1,3,5-trimethyl 2,4,6-tris (3,5-di-tert-butyl-4-hydroxybenzyl)benzene; pentaerythrityl tetrakis-3(3,5-di-tert-butyl-4-hydroxyphenyl)-propionate; 4,4' methylenbis (2,6-tert-butylphenol); 4,4'-thiobis (6-tert-butyl-o-cresol); 2,6-ditertbutylphenol; 6-(4-hydroxyphenoxy)-2,4-bis(n-octyl-thio)1,3,5-triazine; di-n-octadecyl 3,5-di-tert-butyl-4-hydroxybenzyl-phosphonate; 2-(n-octylthio)ethyl 3,5-di-tert-butyl-4-hydroxybenzoate; and sorbitol hexa[3-(3,5-di-tert-butyl-4-hydroxyphenyl)-propionate].

The performance of these antioxidants may be further enhanced by utilizing, in conjunction therewith known synergists such, for example, as thiodipropionate esters and phosphites. Particularly useful is distearylthiodipropionate.

These stabilizers are generally present in amounts of about up to 2 weight percent, preferably 0.25 to 1.0%.

It is also possible to add minor amounts (i.e. less than about 10% by weight of the formulation) of waxes or oils such as (1) low molecular weight (600 to 3000) liquid polybutene; (2) petroleum waxes such as a paraffin wax having a melting point of from about 50°–75° C. and microcrystalline wax having a melting point of from about 60°–90° C.; the latter melting points being determined by ASTM method D127-60; (3) polyethylene greases having a softening point of from about 80°–100° C. and a hardness value, as determined by ASTM method D-1321, of from about 60°–120° C.; (4) hydrogenated animal, fish and vegetable fats and oil such as hydrogenated tallow, lard, soya oil, cotton seed oil, castor oil, menhaden oil and cod liver oil; (5) mineral oil; and (6) synthetic waxes made by polymerizing carbon monoxide and hydrogen, such as Fischer-Tropsch wax.

In addition, relatively small amounts (less than about 5%) isotactic polypropylene may be employed as a reinforcing agent.

Other additives such as fillers, plasticizers, flow modifiers, pigments, dyestuffs conventionally added to hot melt adhesives for various end uses contemplated may also be incorporated in minor amounts into the formulations of the present invention.

The adhesive compositions are prepared by blending the components in the melt at a temperature of about 130°–200° C. until a homogeneous blend is obtained, approximately 2 hours. Various methods of blending are known to the art, and any method that produces a homogeneous blend is satisfactory. An exemplary procedure involves placing the polybutylene, copolymer, amorphous diluent, antioxidant(s) and a portion of the oil (if present), preferably under an inert gas environment, in a jacketed mixing kettle, preferably in a jacketed heavy duty mixer of the Baker-Perkins or Day type, which is equipped with rotors and thereupon raising the temperature to a range of from about 120°–180° C. When the mixture has been masticated to a uniform consistency, the tackifying resin and the remaining components are slowly added over a period in order to avoid the formation of lumps. Mixing and heating are continued until a smooth, homogeneous mass is obtained whereupon the remainder of the tackifying resin and the oil are thoroughly and uniformly admixed therewith.

It is an advantage that the present adhesives may be applied not only by conventional techniques commonly employed in industry but because of their long open time and high heat resistivity, may be applied by spraying from suitable apparatus and nozzles. The adhesives may also be applied by "sputter applicators" which deliver larger adhesive particle as compared to spraying. When spraying or sputtering is utilized, the practitioner can easily determine the amount of hot melt needed to form suitable bonds for the specific end-use. In most instances about 2–5 grams of adhesive per 929 sq. centimeters (1.0 sq. foot) is sufficient.

The adhesive may be used to bond a wide variety of rigid substrates in various carton and case sealing as well as traymaking applications. In general, the substrates most commonly bonded herein are cellulosic, for example, paperboard, corrugated board, chipboard, etc. The substrates to be bonded may be of the same or different material. Thus, the adhesives described herein may be used to produce and seal cartons and cases such as shipping cartons and cases made of corrugated board. Trays, usually made from corrugated board and useful for shipping various goods, are also advantageously produced with the described sprayable adhesives.

The following examples will further illustrate the embodiments of this invention. In these examples all parts given are by weight unless otherwise noted.

EXAMPLE I

This example illustrates the preparation of a hot melt adhesive composition useful in the present invention.

A kettle which had been heated to 150° C. and which was equipped with a stirring paddle was charged with 20 parts amorphous polyalphaolefin (Rextac X-900, El Paso Chemical), 35 parts polybutylene (Duraflex 8910, Shell), and 45 parts Resin H-130 (Eastman), an aliphatic hydrocarbon tackifier having a softening part of 130° C. Then 0.5 parts Irganox 1010 (CibaGeigy), a hindered polyphenol antioxidant, was added. This mixture was completely melted with heating and stirring continued until a homogeneous mass was obtained.

The homogeneous hot melt composition described above (designated Adhesive A) had a viscosity of 5,975 centipoises (cps.) at 350° F., as determined by a Brookfield viscometer using a number 27 spindle at 20 r.p.m.

Additional formulations, designated Adhesives B-D, were also prepared using the procedure described above and are shown in Table I.

TABLE I

| Adhesive | (parts) | | |
|---|---|---|---|
| | B | C | D |
| Polybutylene (Duraflex 8910, (Shell Chemical) | 15 | 35 | 35 |
| Amorphous polyalphaolefin (Rextac X-900) | 20 | — | — |
| Tackifier (Resin H-130, Eastman) | 65 | 45 | 45 |
| Paraffin Wax (160° F.) (Pacemaker 53, Citgo) | — | 20 | — |
| Mineral Oil (Kaydol USP, Witco) | — | — | 20 |
| Antioxidant (Irganox 1010) | 0.5 | 0.5 | 0.5 |

The resultant adhesive formulations were subjected to various tests simulating the properties needed for successful commercial applications using the procedures described below. The results of the testing are shown in Table II.

TEST PROCEDURES

Melt viscosities of the hot melt adhesive were determined at 350° F. on a Brookfield Model RVT Thermosel viscometer using a number 27 spindle at 20 r.p.m.

Open Time - Determined by casting a 5 mil film from the melt (175° C.) onto a level sheet of Kraft paper and then placing a second sheet in contact with the film after a delay period. This delay period (open time) is increased incrementally from 1 second until a fiber tearing bond is no longer witnessed (greater than 50% fiber tear needed). When fiber tear is no longer achieved the open time is recorded. The exact value obtained is highly dependent upon the amount of adhesive applied. Thus, the open time obtained in laboratory testing does not equal the open time obtained or required commercially but does parallel the commercial value. In laboratory testing open time values should be greater than about 10 seconds to approximate the open time requirements of spray applicators.

Elevated temperature peel and elevated temperature shear - Test specimens for determining elevated temperature peel and shear strengths were prepared as follows: an adhesive pattern 1 inch wide was applied at 175° C. to a strip of 50 pound Kraft paper, 1 inch wide by 3 inches long, across the width of the paper. A second piece of Kraft paper of the same dimensions was immediately placed over the first piece and a 200 gram weight placed on top of the composite construction. The compressed adhesive width was 1 inch.

Elevated temperature peel and elevated temperature shear values were determined by attaching a 100 gram weight to each specimen and placing the specimens in a forced-draft oven. The temperature was raised in 5.5° C. (10° F.) increments from 38° C. The specimens remained at a given temperature for 15 minutes for conditioning. The heating cycle was run until the o final bond failed. Each peel and shear specimen was prepared and tested in duplicate. The elevated peel and shear value shown is the average temperature of failure for the two bonds.

Adhesion - The adhesive property was determined by applying a uniform spray of the test adhesive at a coverage density of approximately 2.5 grams/sq. foot to corrugated board stock cut into 2 inch by 3 inch portions. A second piece of stock of the same size was quickly mated with the coated piece and a 500 gram load was placed on the composite construction. After room temperature aging for three days, the bonded substrates were aged for an additional 24 hours at either room temperature, 40° F. or 0° F. At the end of this period, the bonded substrates were peeled or stressed by hand at the bond line so as to break the bond. A determination was made whether the bond was broken with or without fiber tear. Less than 50% fiber tear was designated as "no fiber tear" (no F.T.) while more than 50% fiber tear was designated as "fiber tear" (F.T.).

Heat Stress - Test specimens for determining heat stress were prepared as follows: adhesive was applied by spraying to double-ply, corrugated boardstock (burst strength 275 lbs/sq. inch), 2 inches by 6 inches, in a pattern ¾ inches wide, across the width, centered at a distance of 1 inch from the end. Another piece of boardstock (2 inches by 6 inches) was mated to the first so that there is a 2 inch overlap. After aging overnight, the bottom portion of the assembly is secured on a squared block, about 3 inches high, with the center of the adhesive pattern in line with the edge of the block and a 300 gram weight is placed on the assembly at a distance of 4 inches from the adhesive center. The secured assembly and weight are placed in a constant temperature oven for 24 hour periods starting at a temperature of 115° F. If the assembly does not fail (break at the adhesive bond), another set of assemblies is placed in the oven at a temperature 5° F. higher than the previous temperature and the procedure is repeated. The highest "pass" temperature or lowest "fail" temperature is recorded. A heat stress value of 115° F. or higher is needed for the adhesives herein. FIG. 1 shows a side view of the secured bond assembly with the 300 gram weight. FIG. 1 is not drawn in scale.

Heat Stability - The heat stability of the adhesives was determined by placing a 60 gram sample of the test adhesive into a glass jar which was then covered by aluminum foil. The covered jar was placed in an oven set at 350° F. for 72 hours. At the end of this period, the adhesive was examined for color, skinning and gelling. A melt viscosity at 350° F. was obtained as described above. A significant loss of viscosity undesirable.

The results of the testing are shown in Table II.

TABLE II

| Adhesive | A | B | C | D |
|---|---|---|---|---|
| Viscosity @ 350° F. (cps) | 5975 | 1950 | 1075 | 1620 |
| Heat Stress (°F.) | pass 120° | pass 120° | pass 12.0° | fail 120° |
| Peel Value (°F.) | 140° | 150° | 120° | 120° |
| Shear Value (°F.) | 180° | 170° | 150° | 140° |
| Adhesion-(spray pattern corrugated bond stock) Room temperature | F.T. | No F.T. | No F.T. | F.T. |
| 40° F. | F.T. | No F.T. | No F.T. | F.T. |
| 0° F. | F.T. | No F.T. | No F.T. | F.T. |
| Open time (seconds) | >10 | >10 | 4 | >10 |
| Heat Stability 72 hrs. 350° F., 60 grams | | | | |
| color | amber | amber | amber | amber |
| skin | no | no | no | no |
| gels | no | no | no | no |
| final viscosity @ 350° F. (cps) | 5625 | 1770 | 1300 | 1450 |

The results of the testing show that the specific properties required for commercial case and carton sealing, and tray making applications are obtained only using the compositions described in the present invention.

EXAMPLE II

This example illustrates another adhesive typical of suitable adhesives for use in the present invention (Adhesive 1), as well as adhesives which are outside of the invention and fail to have the required properties (Adhesives 2–5).

Five adhesives were prepared following the general procedure given in Example 1 using the following formulations:

| | parts by weight |
|---|---|
| Adhesive 1 | |
| Polybutylene (Duraflex 8910) | 35.0 |
| Amorphous Diluent | |
| (Afax 600 Himont) | 15.0 |
| (Afax 500 Himont) | 10.0 |
| Tackifier (Resin H-130) | 40.0 |
| Antioxidant (Irganox 1010 Ciba-Geigy) | 0.4 |
| Adhesive 2 | |
| Ethylene vinyl acetate copolymer | |
| (Elvax 240, DuPont 28% ethylene, 50 melt index) | 24.0 |
| (Elvax 210, DuPont 28% ethylene, 400 melt index) | 3.0 |
| Synthetic Wax (softening point 105° C.) | 21.0 |
| Hydrocarbon resin | |
| (Wingtack Extra) | 30.0 |
| (Kristalex 3085, Hercules) | 22.0 |
| Antioxidant | 0.2 |
| Adhesive 3 | |
| Ethylene vinyl acetate copolymer (Elvax 210, DuPont 28% ethylene, 400 melt index) | 7.5 |
| SBS copolymer (Sol T 163, Enichem) | 22.0 |
| SIS copolymer (Sol T 193, Enichem) | 8.0 |

-continued

| | parts by weight |
|---|---|
| Paraffin wax | 28.0 |
| (160F softening point) | |
| Rosin ester tackifier | 34.5 |
| (Permalyn 85, Hercules) | |
| Antioxidant | 1.35 |
| Adhesive 4 | |
| SBS copolymer | 21.0 |
| (Stereon 840A, Firestone) | |
| Tackifier | 60.0 |
| (Zonatac 105, Arizona) | |
| Mineral Oil | 19.0 |
| Antioxidant | 0.3 |
| Adhesive 5 | |
| SIS copolymer | 23.0 |
| (Sol T 192) | |
| Tackifier | |
| Regalrez 6108 | 35.0 |
| Regalrez 3102 | 20.0 |
| Kristalex 540 | 5.0 |
| Mineral Oil | 17.0 |
| Antioxidant | 1.0 |

The resultant adhesives were subjected to the described tests and the results of the testing are shown in Table III.

TABLE III

| Adhesive | 1 | 2 | 3 | 4 | 5 |
|---|---|---|---|---|---|
| Viscosity @ 350° F. (cps) | 4415 | 1250 | 3200 | 1500 | 4500 |
| Heat Stress (°F.) | pass 115° | pass 125° | pass 115° | fail 115° | fail 115° |
| Peel Value (°F.) | 130° | 140° | 130° | 130° | 160° |
| Shear Value (°F.) | 180° | 200° | 150° | 150° | 190° |
| Open time (seconds) | >10 | 3 | 4 | — | — |
| Adhesion-(spray pattern corrugated bond stock) | F.T. | No F.T. | No F.T. | F.T. | F.T. |
| Room temperature | | | | | |
| 40° F. | F.T. | No F.T. | No F.T. | No F.T. | No F.T. |
| 0° F. | —* | No F.T. | No F.T. | No F.T. | No F.T. |
| Heat Stability 72 hrs. 350° F., 60 grams | | | | | |
| color | amber | yellow | yellow | yellow | yellow |
| skin | no | no | no | no | no |
| gels | no | no | no | no | no |
| final viscosity (cps) | — | 1275 | 1825 | 420 | 325 |

*Not tested

The results again show the criticality of formulating the adhesives herein to obtain the properties required for the end-use applications of the present invention. Only Adhesive 1 showed all of the required properties whereas the other adhesives failed one or more of the described tests.

Now that the preferred embodiments of the present invention have been described in detail, various modifications and improvements thereon will become readily apparent to those skilled in the art. Accordingly, the spirit and scope of the invention are to be limited only by the appended claims and not by the foregoing specifications.

We claim:

1. In a method for the bonding of a rigid cellulosic substrate to another rigid cellulosic substrate, the improvement which comprises utilizing as the adhesive therefore a sprayable hot melt adhesive composition comprising 25 to 50 weight percent of an isotactic thermoplastic polybutene-1/ethylene copolymer containing from about 5.5 to about 10% by weight ethylene; 20 to 60 percent of a tackifier; 15 to 30 percent of an amorphous diluent having a softening point greater than 90° C.; 0 to 2 percent antioxidant; and 0 to 10 percent wax or oil.

2. The method of claim 1 wherein the isotactic polybutene-1/ethylene copolymer used in the adhesive has a melt index of 5 to 2000 dg/min.

3. The method of claim 2 wherein the isotactic polybutene-1/ethylene copolymer used in the adhesive has a melt index of 400 to 700 dg/min.

4. The method of claim 1 wherein the amorphous diluent is amorphous polypropylene or other amorphous polyalphaolefin.

5. The method of claim 1 wherein the tackifying resin used in the adhesive is selected from the group consisting of hydrogenated wood rosin or rosin ester; polyterpene resins having a softening point of 80°–50° C.; aliphatic petroleum hydrocarbon resins having a Ball and Ring softening point of 80°–60° C.; and hydrogenated hydrocarbon resins.

6. The method of claim 5 wherein the tackifying resin is a hydrogenated hydrocarbon resin.

7. The method of claim 5 wherein the tackifying resin is an aliphatic petroleum hydrocarbon having a Ball and Ring softening point of 80° to 160° C.

8. The method of claim 1 wherein there is additionally present in the adhesive minor amounts of waxes and oils selected from low molecular weight liquid polybutene; petroleum waxes having a melt point of from about 50°–75° C; microcrystalline wax having a melting point of from about 60°–90° C.; polyethylene greases having a softening point of from about 80°–100° C. and a hardness value of from about 60–120; hydrogenated animal, fish and vegetable fats and oil; mineral oil and synthetic waxes.

9. The method of claim 1 wherein the antioxidant present in the adhesive is a hindered phenol.

10. The method of claim 1 wherein there is additionally present in the adhesive up to about 5 percent by Weight of isotactic polypropylene.

11. The method of claim 1 wherein the adhesive contains 20 to 25 percent by weight of amorphous polyalphaolefin.

12. The method of claim 3 wherein the adhesive has a melt viscosity less than 6000 cps at 175° C. and a peel value of 130° F. or greater.

13. A carton or case made of corrugated paperboard constructed and/or sealed employing the method of claim 1.

14. A tray made of corrugated paper board and constructed by the method of claim 1.

* * * * *